United States Patent Office 3,228,408
Patented Jan. 11, 1966

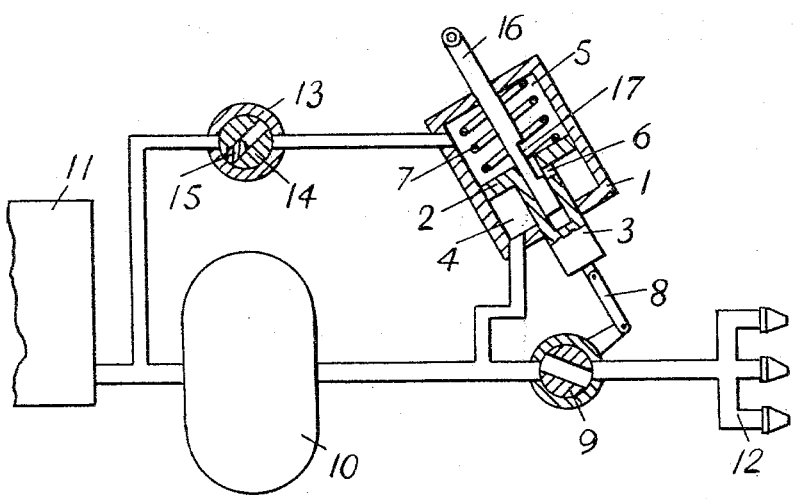

3,228,408
ACCELERATION CONTROL FOR GAS
TURBINE ENGINES
John Michael Crispin Young, Solihull, England, assignor to Joseph Lucas (Industries) Limited, Birmingham, England
Filed Jan. 12, 1962, Ser. No. 165,739
3 Claims. (Cl. 137—18)

In the event of a gas turbine engine being accelerated too rapidly, there is risk of stalling the engine, and the object of the present invention is to provide an acceleration control for a gas turbine engine in a convenient form whereby this risk is minimized.

An acceleration control in accordance with the invention comprises a valve through which fuel flows to the engine, means operable whilst the engine is running at a steady speed for maintaining the valve in a partly open position, and means operable when it is desired to accelerate the engine for opening the valve at a predetermined rate.

The accompanying drawing is a partly sectional and partly diagrammatic view illustrating sufficient of one example for an understanding of the invention.

Referring to the drawing, there is provided a cylinder 1 within which is contained a piston including an annular head 2 having extending therefrom a hollow cylindrical stem 3 closed at its outer end. The stem 3 is slidable through one end wall of the cylinder 1 and defines with the cylinder 1 a first chamber 4, whilst the head 2 defines with the cylinder 1 a second chamber 5. Further, a short passage 6 extends through the wall of the stem 3 to establish communication between the chambers 4, 5.

Within the chamber 5 is a spring 7 acting in a direction to decrease the size of the chamber 4. Further, the stem 3 is connected through a link 8 to a valve 9 in the fuel supply system of the gas turbine engine. This system includes a pump 10 for supplying fuel from a reservoir 11 to the engine burners 12, the valve 9 being situated intermediate the pump 10 and the burners 12, and the arrangement being such that the spring 7 acting on the head 2 tends to reduce the fuel supply to the burners 12.

The chamber 4 is connected to the delivery side of the pump 10, whilst the chamber 5 is connected to the inlet side of the pump 10 through a device 13 which returns to the inlet side of the pump 10 an amount of fuel dependent on the engine speed. Conveniently the device employed is a shuttle valve, that is a body 14 rotated by the engine and having extending therethrough a diametrical bore accommodating a shuttle 15. When the bore registers with the chamber 5 the pressure in the latter forces the shuttle 15 to the remote end of the bore, and the remainder of the bore is filled with fuel. After rotating through 180° the shuttle 15 is again forced to the opposite end of the bore, and the fuel previously retained in the bore is delivered to the inlet side of the pump 10.

Extending into the cylinder 1 is a control rod 16 operable by the pilot. The lower end of the rod 16 fits within the stem 3 of the piston, but the rod 16 is formed with a cut-away portion 17 such that the position of the rod controls the flow of fuel from the chamber 4 to the chamber 5.

The arrangement is such that when the engine is running at a steady speed the flow of fuel from the chamber 4 to the chamber 5 is just sufficient to balance the flow of fuel through the device 13. Under such conditions the valve 9 occupies the partly open position shown. When it is desired to accelerate the engine the control rod 16 is moved away from the piston so that the portion 17 lies within the chamber 5, and communication between the chambers 4, 5 is broken. The pressure in the chamber 5 now commences to fall as a result of flow of fuel through the device 13, and hence the piston begins to move against the action of the spring 7 to operate the valve 9 in a manner to increase the fuel flow to the burners 12. It will be appreciated that the rate at which the engine will be accelerated will depend on the speed of the engine, since the latter determines the rate of escape of fuel from the chamber 5 through the device 13. In this way over-rapid acceleration is prevented and the risk of stalling minimized.

When it is required to decelerate, the control rod 16 is moved in the opposite direction to increase the flow of fuel between the chambers. The pressures in the two chambers now approach equality so that the piston is moved in the direction to decrease flow of fuel to the engine.

It may be advantageous to shape the cut-away portion of the control rod 16 so that when the rod 16 is moved by the pilot to the limit of its travel in a direction towards the piston, deceleration of the engine can be effected quickly in cases of emergency.

Although in the example described the device 13 allows fuel to flow from the chamber 5 at a rate dependent on engine speed, with certain engines the advantages of the invention can be at least partly obtained by allowing leakage from the chamber 5 at a constant rate independent of engine speed. Such a system would be suitable for use with aircraft where a less sensitive acceleration control is required.

Having thus described my invention what I claim as new and desire to secure by Letters Patent is:

1. An acceleration control for a gas turbine engine, comprising a pump for supplying fuel to the engine, a cylinder, a piston slidable within the cylinder and dividing the latter into a first chamber which is connected to the delivery side of the pump, and a second chamber which is connected to the inlet side of the pump through a device which in use spills fuel from the second chamber at a predetermined rate, a passage in the piston through which fuel can flow from the first chamber to the second chamber, a spring loading the piston in a direction to decrease the size of the first chamber, said spring balancing the pressure drop between the first and second chambers when the engine is running at a steady speed, a valve through which fuel flows to the engine, said valve being connected to the piston so as to occupy a partly open position when the engine is running at a steady speed, and means for breaking communication between the first and second chambers when it is desired to accelerate the engine, whereafter the pressure in the second chamber drops at a rate dependent on said device and the piston is moved to open the valve at said rate.

2. An acceleration control as claimed in claim 1 in which said device spills fuel from the second chamber at a rate dependent on the speed of the engine.

3. An acceleration control as claimed in claim 2 in which said device is a shuttle pump driven by the engine.

References Cited by the Examiner
UNITED STATES PATENTS

| | | | |
|---|---|---|---|
| 2,055,539 | 9/1936 | Jacoby | 123—98 X |
| 2,104,649 | 1/1938 | Henton | 123—98 |
| 2,362,655 | 11/1944 | Mallory | 137—51 X |
| 2,702,560 | 2/1955 | Bobier | 137—48 |
| 2,981,321 | 4/1961 | Freeman | 137—18 X |
| 3,023,801 | 3/1962 | Kinney | 60—39.28 X |

ISADOR WEIL, Primary Examiner.